United States Patent [19]
White

[11] Patent Number: 6,125,372
[45] Date of Patent: Sep. 26, 2000

[54] SERVER SYSTEM AND METHOD OF UPDATING SERVER SOFTWARE

[75] Inventor: Craig R. White, Boise, Id.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/943,888

[22] Filed: Oct. 3, 1997

[51] Int. Cl.[7] ................................................ G06F 17/30
[52] U.S. Cl. ........................ 707/205; 379/114; 364/200
[58] Field of Search ........................... 707/203, 205, 707/204, 10, 101; 705/35; 379/114, 113, 115, 130, 133; 364/222, 281, 962, 974, 245, 200; 710/8; 358/1, 403; 365/189, 195, 227; 400/703; 395/182

[56] References Cited

U.S. PATENT DOCUMENTS

| | | | |
|---|---|---|---|
| 4,999,766 | 3/1991 | Peters et al. | 364/200 |
| 5,236,348 | 8/1993 | Fetherolf et al. | 400/703 |
| 5,339,435 | 8/1994 | Lubkin et al. | 395/712 |
| 5,513,314 | 4/1996 | Kandasamy et al. | 395/182 |
| 5,515,536 | 5/1996 | Corbett et al. | 395/685 |
| 5,537,585 | 7/1996 | Blickenstaff et al. | 707/205 |
| 5,537,626 | 7/1996 | Kraslavsky et al. | 710/8 |
| 5,550,957 | 8/1996 | Davidson et al. | 395/114 |
| 5,572,643 | 11/1996 | Judson | 395/200 |
| 5,636,333 | 6/1997 | Davidson et al. | 395/114 |
| 5,715,381 | 2/1998 | Hamilton | 358/1 |
| 5,799,072 | 8/1998 | Vulcan | 379/114 |
| 5,815,722 | 9/1998 | Kalwitz et al. | 395/712 |
| 5,931,911 | 8/1999 | Remy et al. | 365/189 |
| 5,968,121 | 10/1999 | Logan et al. | 709/219 |

*Primary Examiner*—Wayne Amsbury
*Assistant Examiner*—Thu-Thao Havan

[57] ABSTRACT

A system with resource server updating provides upgraded system operation by installing replacement files on the resource when needed and without manual intervention. The system in an exemplary embodiment includes client workstations, a file server, and several resource servers coupled to a network for data communication. Several printers, scanners, and other peripherals are coupled to each resource server. In response to a hypertext page provided by the file server to a workstation, a user initiates file version checking and file replacements on all resource servers on the network. Replacement files exist on the file server or are obtained from a remote file server, as needed.

34 Claims, 3 Drawing Sheets

SERVER SYSTEM AND METHOD OF UPDATING SERVER SOFTWARE

FIELD OF THE INVENTION

This invention relates to network based computer systems and to systems and methods for maintaining file systems up to date.

BACKGROUND OF THE INVENTION

Office computer systems ordinarily include a network that couples several workstation computers together with shared peripheral equipment, such as a shared printer. The process of printing a document on the shared printer from one of the workstations ordinarily involves the proper cooperation of several programs. These programs, generally called drivers, are developed and frequently re-released by independent software suppliers. To provide wide application of a single driver design, the driver accepts configuration parameters set by the system manager during driver installation. In general, a peripheral is a resource. The process of installation and maintaining operation of the peripheral is called resource administration.

Large office systems with multiple resource servers are subject to costly system failures as a consequence of frequent driver upgrades. Such upgrades necessitate manually transferring files from removable media inserted into the local disk drive of each resource server computer. Considerable system management labor is spent determining, at each resource server, which driver program files are to be replaced and then accurately accomplishing the upgrade. Errors in accomplishing the upgrade lead to system failures related to incompatible combinations of driver program files and configuration parameters. System failures in large offices adversely affect numerous employees and critical business activities.

In view of the problems described above and related problems that consequently become apparent to those skilled in the applicable arts, the need remains in network based computer systems for systems and methods for resource administration and maintaining file systems up to date.

For clarity, many details of distributed processing application program design are omitted from the disclosure below, because they are known in the art. Concepts and terminology used to describe embodiments of the present invention are intended to be consistent with current research, industry standards, and the conventions of the current major manufacturers and developers of computer systems and software. Guidance into the extensive literature that applies to the present invention is provided by: "Developing Client/Server Applications," by W. H. Inmon, QED Publishing Group of Wellesley Mass., 1993; "RPC for NT," by Guy Eddon, R&D Publications of Lawrence Kans., 1994; "Object-Oriented Languages, Systems and Applications," edited by Gordon Blair, et al., Halsted Press of New York N.Y., 1991; "Advanced Windows NT," by Jeffrey Richter, Microsoft Press of Redmond Wash., 1994; and the bibliographies contained in each of these texts.

SUMMARY OF THE INVENTION

Accordingly, a computer system in one embodiment of the present invention includes a workstation, a resource, and a server. The resource is in data communication with the workstation and with the server. The server performs a method including the steps in any order of (a) receiving from the workstation an indication for continuing performance of the method; (b) communicating with the resource to receive an identification of the resource; (c) accessing from the resource a file version indicator in response to the identification; and (d) storing a replacement file from the server onto the resource, wherein after storing, the resource operates in response to the replacement file.

According to a first aspect of such an embodiment, the replacement file is installed on the resource without manual operations at the server. By applying such a method in a network having multiple resources, the cost of resource administration is reduced.

BRIEF DESCRIPTION OF THE DRAWING

A preferred exemplary embodiment of the present invention is described below with reference to the drawing in which.

DETAILED DESCRIPTION OF THE PREFERRED EMBODIMENT

Figure 1:
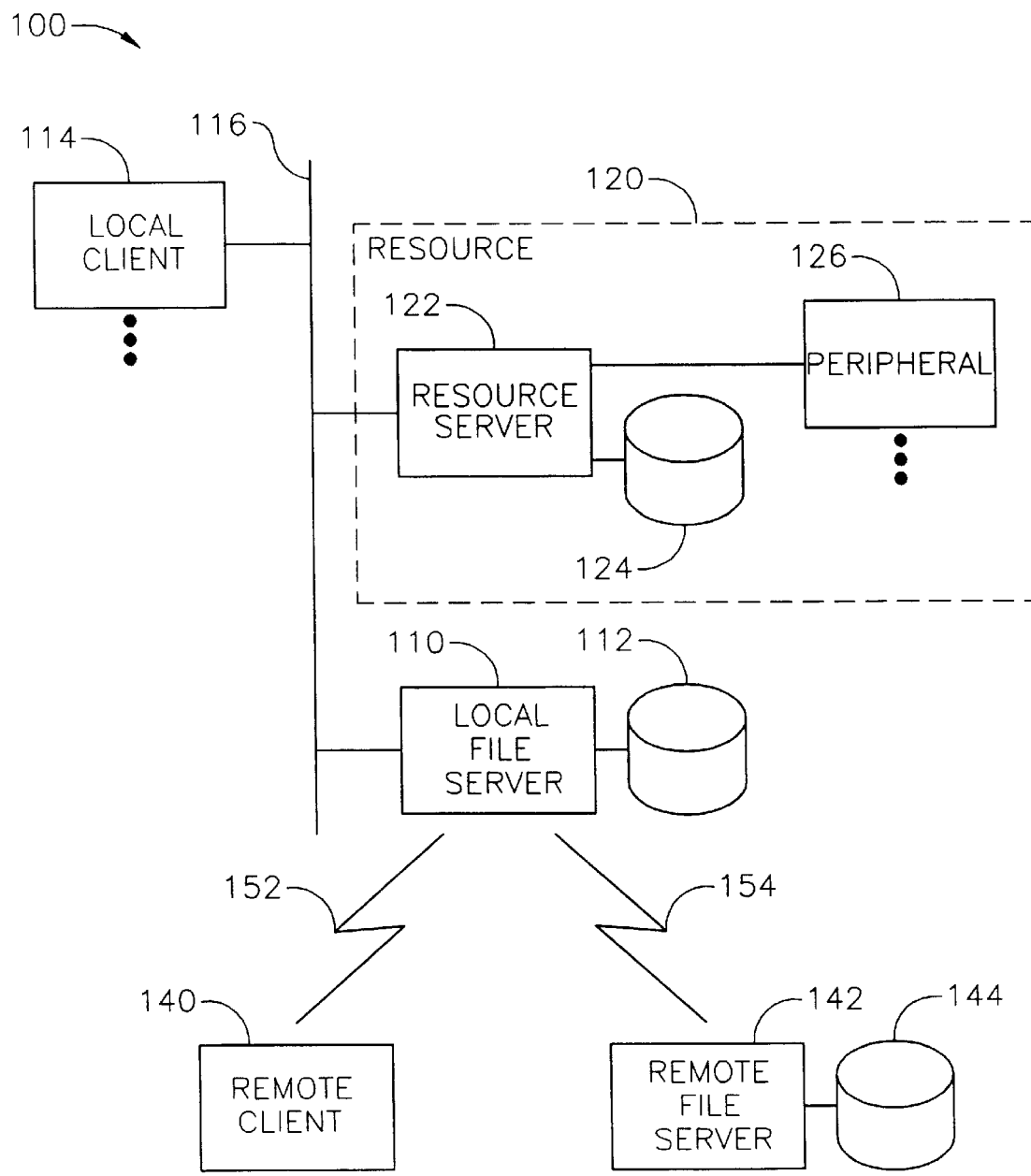
FIG. 1 is a block diagram of a system in one embodiment of the present invention.

FIG. 1 illustrates computer system 100 for the purpose of describing various aspects of the present invention, including the capability to conveniently upgrade system operation by initiating an upgrade from a workstation. A network based computer system of the present invention is any computer system that performs a first distributed processing application program wherein upgrading the component files of the first application is accomplished using a second distributed processing application program. Computer system 100 is one example.

Computer system 100 is a network based computer system that includes one or more workstations, one or more resources, and one or more servers, all cooperating via network links. System 100 includes network links 116, 152, and 154; local client 114 and remote client 140, together representing various computer workstations; resource 120 representing one of several resources, each resource having a resource server 122, a file system 124, and one or more input/output subsystems represented by peripheral 126; and local and remote file servers 110, 142 each with a file system 112, 144 together representing various file servers on the network.

A network is made up of network links that are dedicated or temporary. A network link is any data communication mechanism between servers, between workstations, or between a server and a workstation. For example, network links 116, 152, and 154 are conventional channels which operate independently or as a unified network such as a wide area network, a local area network, or a network compatible with the world wide web. Any of various protocols accomplish data communication including for example Ethernet, token ring, or packet switched technologies. A conventional packet protocol for passing data communication messages (e.g., TCP/IP) is supported in computer system 100 by conventional circuits, firmware, and software residing in local client 114, resource 120, local file server 110, remote client 140, and remote file server 142.

A workstation is any computer that permits a user to send and receive information over a network. For example, local client 114 includes a conventional workstation having a conventional operating system, browser, and word processor. The operating system, for example, is of the type known as Windows NT marketed by Microsoft which supports network link 116. The browser, for example, is of the type known as Navigator marketed by Netscape. The word processing program, for example, is of the type known as Word marketed by Microsoft. Local client 114 represents one of possibly many workstations, joined variously to network 116 for cooperation according to the conventional peer-to-peer or conventional client-server computing models. In each of these models, local client 114 shares access to one or more resources represented by resource 120. Remote client 140 is functionally identical to local client 114 except as to the form of network link. Local client and remote client together represent various workstations.

A resource is any input or output subsystem capable of operating on a network. For example, resource 120 supports network link 116 for data communication. Resource 120 plays a role in accomplishing distributed processing application programs, for example involving cooperation with local client 114 and involving cooperation with local file server 110. Some component files of such distributed processing application programs are stored in file system 124. Input/Output subsystem capabilities and network communication capabilities may be separated (as shown) or combined.

A computer peripheral device is any input/output subsystem. Some peripheral devices are primarily input devices (e.g. a scanner, a camera, or a measurement instrument) providing input data to system 100. Others are primarily output devices (e.g. a printer, a plotter, or an audio/visual component) providing data output from system 100. Still others have input and output capability (e.g. a modem, a data storage disk system, a tape system, or a robot). Peripheral 126, for example, is a conventional electrophotographic printer for use by an operator of local client 114.

A resource server is any computer that provides network communication capability for one or more peripherals. For example, resource server 122 is a conventional microprocessor based server equipped for managing print queues, and for supporting network link 116.

In a variation of resource 120, the functions of resource server, file system, and input/output subsystem are combined into the resource as one device for subsystem packaging economies, modular expansion, economies of scale, and higher utilization of equipment.

A file server is any computer that serves to manage access to files across a network link. Files include data and programs used by the file server itself and as components of distributed processing application programs throughout computer system 100. For example, local file server 110 is a conventional microprocessor based server equipped for managing access to files on file system 112 via network link 116. Remote file server 142 is functionally identical to local file server 110, except as to the form of network link 154. Local file server 110 and remote file server 142 together represent various file servers.

Each file server 110, 142, includes a conventional operating system, for example, of the type known as Windows NT, marketed by Microsoft; web manager software, for example, of the conventional type compliant with Hypertext Transfer Protocol (HTTP); and components of distributed processing application programs according to various aspects of the present invention.

A file system is any conventional mechanism for automatically storing and providing automatic access to information in machine readable form. For example, file systems 124, 112, and 144 are coupled respectively to resource server 122, local file server 110, and remote file server 142 for directly storing and directly accessing files respectively by resource server 122, local file server 110, and remote file server 142. Network software (conventionally part of the operating system) operating in these three servers provides automatic file storage and access by any of the three servers to any of the three file systems. Appropriate network security functions are included in conventional network software.

File system 124, 112, and 144 each include any memory device capable of data storage and retrieval. For example, each file system includes a conventional disk drive with a conventional directory structure of named files. Each file in the directory is associated with a size and a date last modified. The file name, the size, the date, or any combination is used to indicate the version of the file.

A distributed processing application program is any suite of executable computer program files and data files designed to cooperate to perform a function across a network. For example, initiating at local client 114 the upgrading of resource 120 involves several component computer program files and component data items to be discussed with reference to FIGS. 2 and 3. As another example, initiating (at local client 114) the printing of a document on peripheral 126 involves several component executable computer program files and component data files to be discussed with reference to FIG. 3. In each example, the particular configuration of the distributed processing application program may be the result of an ad hoc arrangement of components wherein each component was designed to conform to various interfaces which operationally permit cooperation as a distributed processing application program. As a case in point, printer suppliers may develop and provide drivers for operation on resource server 122 for each model of printer, operating system providers may provide spoolers for operation on resource server 122 for each model of several computers, and a word processor provider may provide driver software for printing. The user conventionally relies on the cooperation of particular drivers and a particular spooler selected ad hoc but with reliance on predefined interfaces between these components.

Client workstations 114 and 140 communicate with file servers 110 and 154 using HTTP in a conventional manner wherein the web browser on the client identifies a uniform resource locator (URL) to the web site software on a file server. In response, the web site software provides to the client a "page" compliant with the Hypertext Markup Language (HTML). Such communication is of the type described in U.S. Pat. No. 5,572,643 to Judson, incorporated herein by reference.

Servers 110, 122, and 142 cooperate in any conventional manner accomplishing message and file transfer. Messages maintain functional cooperation and some include file names and version indicators. File transfers are accomplished by conventional techniques wherein, for example, (a) local and remote servers 110 and 142 each include a file transfer program, (b) local and remote servers cooperate in a manner similar to the cooperation of local client 114 and a server as described above, or (c) servers including 122, 110, and 142, support connection to the Internet. In this latter example, message and file transfer is accomplished by the known protocol TCP/IP.

Figure 2:
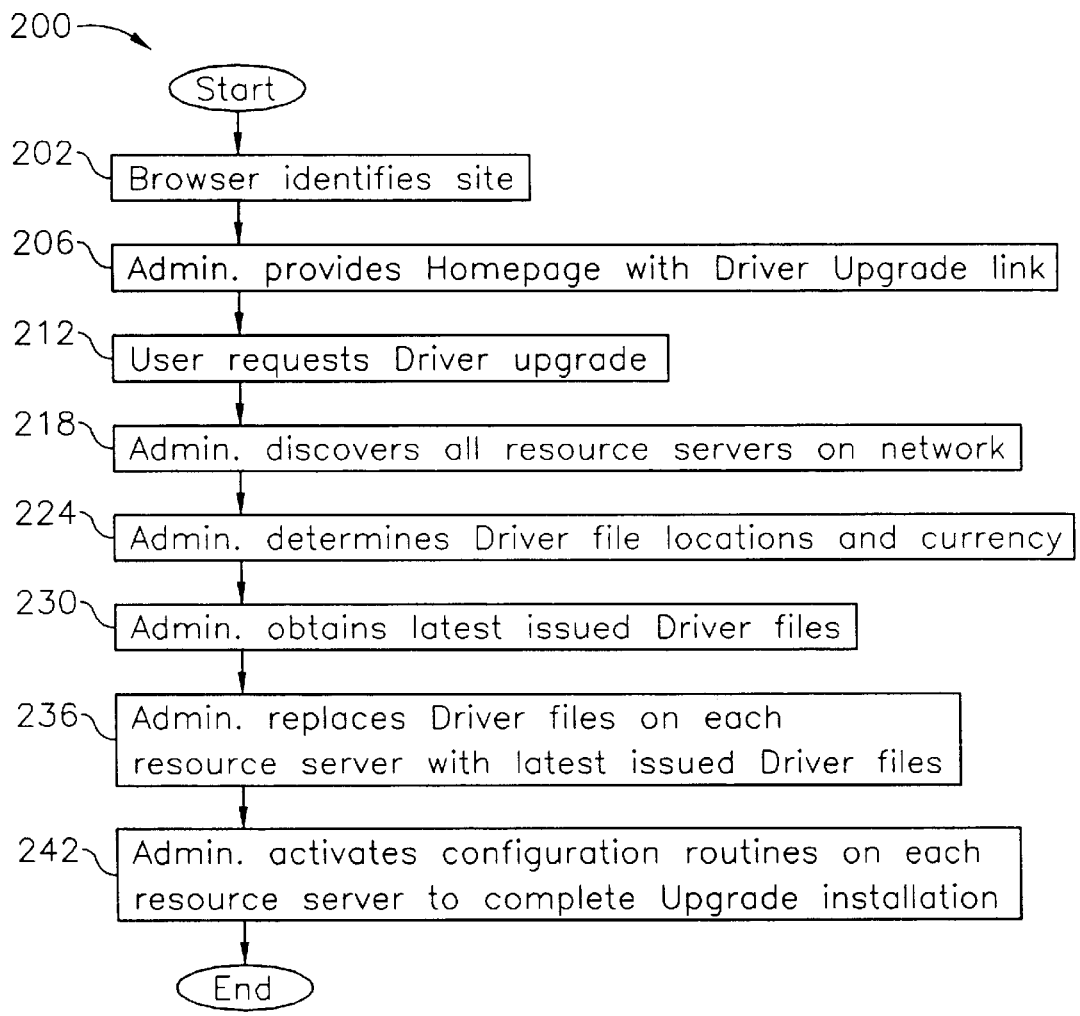
FIG. 2 is a flow chart of a method of upgrading the system of FIG. 1.
Figure 3:
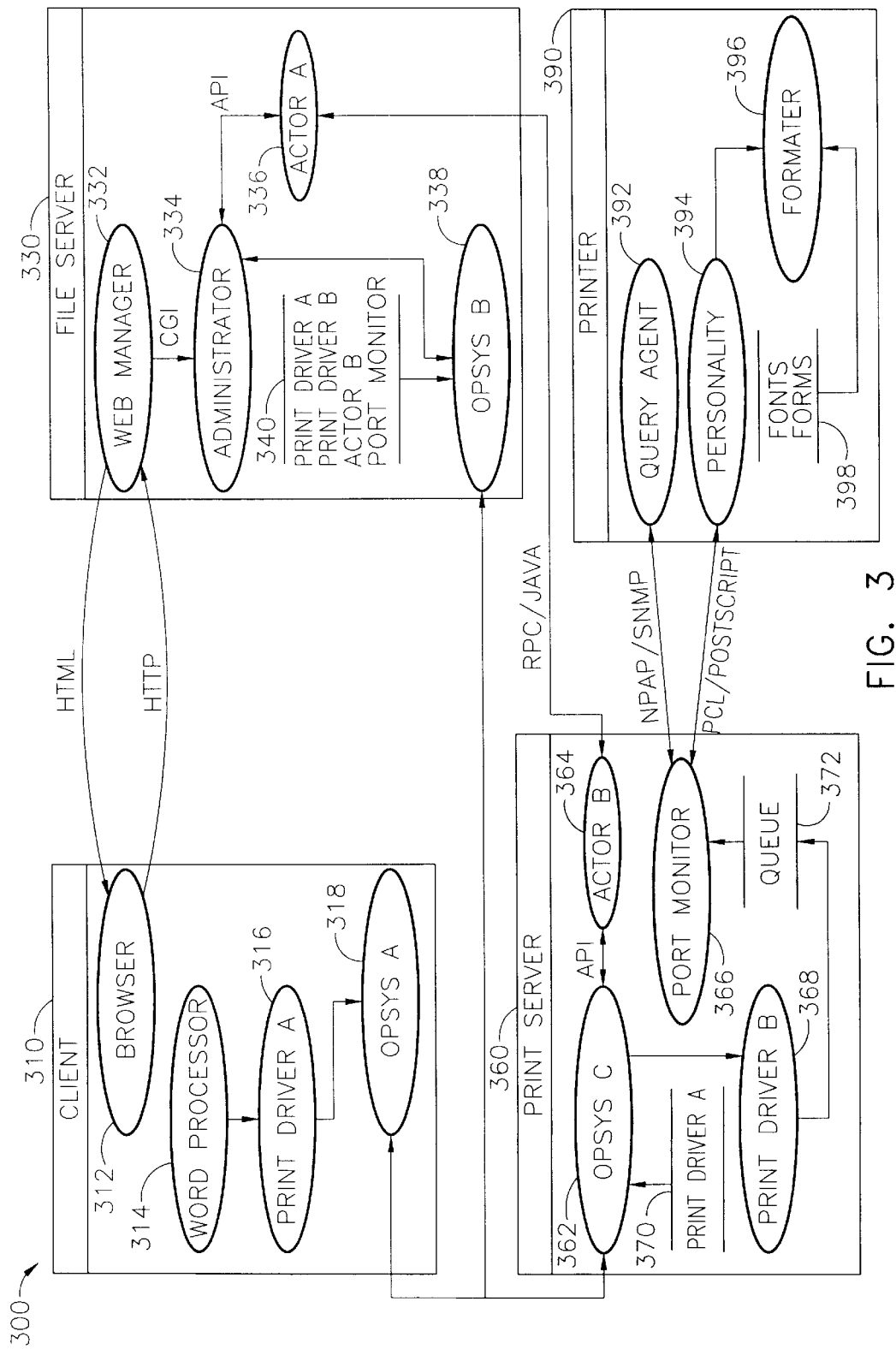
FIG. 3 is a data flow diagram in one embodiment of the method of FIG. 2.

A method of resource administration of the present invention provides upgraded system operation by installing replacement files on a server. For example, method 200 of FIG. 2 is implemented in one embodiment according to a distributed processing application program 300 of the data flow diagram of FIG. 3. Method 200 operates on system 100 wherein an operator using a browser program on local client 114 initiates an upgrade to resource 120 for improved cooperation between a word processor program on local client 114 and an electrophotographic printer. In this example, resource 120 includes a print server 360 and a printer 390 which exemplify resource server 122 (with file system 124) and peripheral 126, described more generally with reference to FIG. 1.

At step 202, the operator at client workstation 310 (either local client 114 or remote client 140), intending to upgrade system 100, requests a page from file server 330 (either local file server 110 or remote file server 142). To request a page, the operator specifies an appropriate URL to browser 312 in a conventional manner. As a result of the cooperation of browser 312, operating system A 318, operating system B 338, and web manager 332, an HTTP message is received by web manager 332 in file server 330. The operating systems 338 and 332 are configured differently (indicated by A and B), and provide conventional network communication.

At step 206, a response HTML file containing the page is returned to browser 312 by web manager 332. By requesting receipt of a page (a) administrator 334 can be activated by manually following a hypertext link in that page, as in step 212, or (b) administrator 334 can be automatically activated by the request for transferring that URL's page to local client 114. Activation of administrator 334 from a hypertext link in an HTML file is conventionally accomplished via a gateway interface command such as a command of the known Common Gateway Interface (CGI).

In either case, the operator has had an opportunity to control execution of method 200 at step 202 or step 212. The requested page is an example of a request by the file server to proceed with the method and activating the response link is an indication to continue performance of the method.

At step 218, web manager 332 has responded to browser 312 with an HTML file containing the requested page and has activated administrator 334, now running in cooperation with web manager 332 on file server 330. Administrator 334 attempts to establish communication with each resource in system 100. Prior to establishing such communication, administrator 334 discovers the identity (IP address, IPX address, etc.) of each resource, then uses the identity for logical point-to-point communication. Identification is accomplished either (a) by the cooperation of operating system B 338 executing on file server 330 and operating system C 362 executing on print server 360, or (b) by cooperation of actor A 336 in file server 330 and actor B 364 in print server 360. When identification is not supported by operating systems 338,362, actors are used.

Communication between file server 330 and print server 360 according to the present invention is implemented with operating system software (for example, supporting the link between 338 and 362), with application specific software (for example, supporting the link between 336 and 364), or with a combination of both. Application specific software includes any software that provides distributed processing across a network. For example, actors 336 and 364 communicate either (a) by using remote procedure calls, or (b) by using virtual machines, such as those of the type compliant with object oriented programming languages, for example the Java programming language. Many known operating systems, including Microsoft Windows NT, support remote procedure call (RPC) technology and/or multi thread technology for support of virtual machines.

Communication between administrator 334 and actor A 336 and between actor B 364 and operating system C 362 conforms to the application program interface (API) defined by the respective operating system 338 and 362.

After discovery of all resource servers in step 218, the operator may be given another opportunity to control method 200 by selecting which resource server to upgrade.

At step 224, administrator 334 accesses file system 124 to obtain the filename and version indication for all files used by print server 360 (perhaps limited to files for printer 390 and perhaps further limited to files for word processor 314). Such files 370 (including Print Driver A 316, Print Driver B 368, components of Actor B 364, and Port Monitor 366), are maintained on file system 124. Access is accomplished in a preferred embodiment through actors 336 and 364 using the discovered identity of resource 120, resource server 122, peripheral 126, or a combination of such identities.

In a variation of the present invention, administrator 334 further accesses printer 390 to obtain the filenames and version indications stored with printer 390. Such files 398 (including font and form files, and components of Personality 394) are stored in any memory device of or installed with printer 390. In this variation, access to files stored with printer 390 is provided by cooperation of actor B 364, port monitor 366, and query agent 392. Communication between port monitor 366 and query agent 392 conforms to any interface protocol, for example the Network Printing Alliance Protocol (NPAP) used by Lexmark International, Inc. of Greenwich, Conn., or the Simple Network Management Protocol used by Hewlett-Packard, Co. of Boise, Id.

After obtaining a list of file names and version indications, administrator 334 accesses file system 112 to obtain the filename and version indication for all files designated to be used by print server 360 (perhaps limited to files for printer 390 and perhaps further limited to files for word processor 314). Such files 340 (including Print Driver A 316, Print Driver B 368, components of Actor B 364, and Port Monitor 366), are maintained on file system 112. Access to file system 112 is accomplished through operating system B 338.

In a variation of the present invention, administrator 334 further accesses file system 144 through remote file server 142 to confirm designations and to obtain files not currently present on file system 112. Access to file system 144 is accomplished through web manager 332, designating the URL of remote file server 142.

In a further variation of the present invention, files designated to be used by printer 390 (including font and form files, and components of Personality 394) are confirmed and obtained as needed.

The filenames and version indicators obtained as described above are compared by administrator 334 to determine file currency. In other words if a designated file does not exist on file system 124, then that file is identified as to be obtained and to be copied (i.e., installed). If a designated file exists and a file of the same filename has a version indicator less current than the designated version, then that file is identified as to be copied (i.e., replaced).

At step 230, all files identified as to be obtained are copied from file system 144 to file system 112 as described above.

At step 236, all files identified as to be copied are copied from file system 112 to file system 124.

At step 242, administrator 334 in cooperation with actor A 336, actor B 364, operating system 338, and operating system 362 activates configuration routines on each resource server to complete the installation of updated files and to activate upgraded system operations. Provisions are made in a preferred embodiment to avoid disruption of the current operation of resource 120. For example, further inquiry by actor B and further communication between actors A and B accomplish the following: (a) if files are pending in queue 372 and printing is feasible under the current configuration of resource 120, printing continues until queue 372 is empty, and (b) if print driver B is to be copied and print driver B is designated as compatible only with the upgraded version of print driver A 316, then distribution of print driver A 370 from print server 360 to client 310 is coordinated with replacing print driver B. In a variation of the present invention, replacement or copying of files is separate from activating use of replaced or copied files. Synchronization of components and their configuration is thereby simplified and disruption of access to printing by word processor 314 is minimized or avoided.

Configuration routines include methods involving obtaining and setting parametric values of printer 390 and of transferring and activating files from file system 124 to printer 390. Additional configuration steps are included to synchronize the system upgrade with current operations of printer 390, analogous to steps involving queue 372 as discussed above.

Configuration routines are sent by actor A to Actor B for execution by print server 360. Configuration routines are implemented in any programming language, scripting language or interpreted language. For example, in one variation compiled routines respond to remote procedure calls. In another variation, Java applets are interpreted on a virtual machine.

At the completion of method 200, the distributed processing application program responsible for printing a document from word processor 314 on printer 390 has been upgraded. An example of upgraded operation proceeds in several steps as follows. Data to be printed is identified as directed at queue 372 by word processor 314. Operating system 318 verifies that print driver A 316 at client 310 matches print driver A 370 at print server 360, and if not updates print driver A 316 at client 310. After passing through print driver A 316, operating systems 318 and 362 cooperate to route the data through print driver B 368, queue 372, and port monitor 366. Port monitor 366 passes the data via a known printer interface protocol to printer 390. For example, the printer interface marketed by Hewlett-Packard as PCL or the printer interface marketed by Adobe as Postscript is used. An appropriate personality process 394 in printer 390 receives the data and passes it to formatter process 396 where fonts and forms from files 398 may be employed during the formation and production of the printed image. As a result, when any of the aforementioned components of the printing distributed processing application program have been copied (i.e., installed or replaced), the updated program and data components are used in place of less current versions.

The foregoing description discusses preferred embodiments of the present invention, which may be changed or modified without departing from the scope of the present invention.

For example, operations at step 224 through 242 are repeated for each resource identified as to be upgraded. Such an upgrade of multiple resources proceeds without manual intervention from the time it is last controlled by the operator at step 202 or step 212. These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and practice of the invention to one of ordinary skill in the art to which the invention applies.

What is claimed is:

1. A method for resource administration for a computer system wherein:
    a. the computer system comprises:
        (1) a workstation;
        (2) a resource in data communication with the workstation, the resource comprising a first file system, the first file system comprising a first file and a first version indication of the first file, an operation, on data received by the resource, being performed by the resource in accordance with the first file; and
        (3) a file server in data communication with the workstation and with the resource, the server comprising a second file system comprising a second file and a second version indication of the second file; and
    b. the method, performed by the first server, comprises:
        receiving at the file server an indication from the workstation to continue performance of the method;
        communicating with the resource to receive an identification of the resource;
        accessing the first version indication in response to the identification; and
        directing storage of the second file on the first file system wherein, after storing, an operation, on data subsequently received by the resource, is performed by the resource in accordance with the second file instead of the first file.

2. The method of claim 1 wherein the step of accessing the first version indicator comprises a remote procedure call.

3. The method of claim 1 wherein the method further comprises comparing the first version indication with the second version indication to provide a comparison, and the step of directing storage is conditionally performed in response to the comparison.

4. The method of claim 1 wherein:
    a. the system further comprises a second file server in data communication with the file server, the second file server comprising a third file system comprising the second file and the second version indication; and
    b. the method further comprises accessing, prior to the second file system comprising the second file, the second file on the third file system and storing the second file on the second file system.

5. The method of claim 4 wherein accessing the second file comprises a gateway interference command.

6. The method of claim 1 wherein the method further comprises the step of transmitting to the workstation a request to proceed with the method.

7. The method of claim 6 wherein the request comprises a hypertext link.

8. The method of claim 7 wherein the indication for continuing comprises a gateway interface command.

9. The method of claim 1 wherein the step of communicating with the resource comprises a gateway interface command.

10. The method of claim 1 wherein:
    a. the resource further comprises a resource server in data communication with the file server, and a peripheral coupled to the resource server, the peripheral having a peripheral identification; and b. the method further comprises:
accessing the peripheral identification; and
accessing the first version indication in response to the peripheral identification.

11. A data storage medium comprising machine readable indicia recorded on the medium, the indicia comprising instructions for performing a method by a provided computer system, wherein:

(1) the computer system comprises:
  (a) a workstation;
  (b) a resource in data communication with the workstation, the resource comprising a first file system, the first file system comprising a first file and a first version indication of the first file, an operation, on data received by the resource, being performed by the resource in accordance with the first file; and
  (c) a file server in data communication with the workstation and with the resource, the file server comprising a second file system comprising a second file and a second version indication of the second file; and (2) the method performed by the file server comprises:
  receiving, at the file server an indication from the workstation to continue performance of the method;
  communicating with the resource to receive an identification of the resource;
  accessing the first version indication in response to the identification; and
  directing storage of the second file on the first file system wherein, after storing, an operation, on data subsequently received by the resource, is performed by the resource in accordance with the second file instead of the first file.

12. The medium of claim 11 wherein the step of accessing the first version indicator comprises a remote procedure call.

13. The medium of claim 11 wherein the method further comprises comparing the first version indication with the second version indication to provide a comparison, and the step of directing storage is conditionally performed in response to the comparison.

14. The medium of claim 11 wherein:
  a. the system further comprises a second file server in data communication with the file server, the second file server comprising a third file system comprising the second file and the second version indication; and
  b. the method further comprises accessing, prior to the second file system comprising the second file, the second file on the third file system and storing the second file on the second file system.

15. The medium of claim 11 wherein accessing the second file comprises a gateway interface command.

16. The medium of claim 11 wherein the method further comprises the step of transmitting to the workstation a request to proceed with the method.

17. The medium of claim 16 wherein the request comprises a hypertext link.

18. The medium of claim 17 wherein the indication for continuing comprises a gateway interface command.

19. The medium of claim 11 wherein the step of communicating with the resource comprises a gateway interface command.

20. The medium of claim 11 wherein:
  a. the resource further comprises a resource server in data communication with the file server, and a peripheral coupled to the resource server, the peripheral having a peripheral identification; and
  b. the method further comprises:
  accessing the peripheral identification; and
  identifying the first version indication in response to the peripheral identification.

21. The method of claim 4 wherein:
  a. the system further comprises a network for data communication between the file server and a plurality of resources; and
  b. the method further comprises:
  discovering each resource of the plurality; and
  performing the steps of communicating and accessing with respect to each discovered resource.

22. The method of claim 11 wherein:
  a. the system further comprises a network for data communication between the file server and a plurality of resources; and
  b. the method further comprises:
  discovering each resource of the plurality; and
  performing the steps of communicating and accessing with respect to each discovered resource.

23. A method for upgrading cooperation of a user program and a printer, the printer being part of a print subsystem comprising the printer and a print server having a file system, the method comprising:
  a. as performed by a user:
  requesting, using a browser at a client workstation, a page from a file server coupled by a network to the client workstation; and
  activating a hypertext link in the page to activate an administrator program; and
  b. as performed by the administrator program:
  discovering an identity of the print subsystem;
  establishing point-to-point communication between the administrator program and the print subsystem;
  obtaining from the file system a first file name and a first version indicator for a first file used by the printer;
  obtaining from the file server a second version indicator for a second file corresponding to the first file;
  comparing the first version indicator and the second version indicator; and
  directing the replacement of the first file with the second file in accordance with a result of comparing, the user program thereafter utilizing the printer in accordance with the second file.

24. The method of claim 23 wherein the identity of the print subsystem comprises an identity of the printer.

25. The method of claim 23 further comprising, as performed by the administrator program, activating a configuration routine to be executed by the printer.

26. The method of claim 23 wherein:
  a. the step of directing comprises:
  identifying a file replacement operation in accordance with the result of comparing; and
  b. the method further comprises:
  repeating the steps of obtaining from the file system, obtaining from the file server, comparing, and identifying to identify a plurality of file replacement operations before performing any of the file replacement operations.

27. The method of claim 7 wherein:
  a. the step of communicating with the resource comprises communicating with a plurality of resources, the plurality including the resource; and b. the request further comprises a respective hypertext link for each resource of the plurality.

28. A method for upgrading cooperation of a user program and a printer, the printer being part of a print subsystem comprising the printer and a print server having a file system, the method comprising:

b. as performed by a user:
  requesting, using a browser at a client workstation, a page from a file server coupled by a network to the client workstation; and
  activating a hypertext link in the page to activate an administrator program; and b. as performed by the administrator program:
  discovering an identity of the print subsystem;
  establishing point-to-point communication between the administrator program and the print subsystem;
  obtaining from the file server a first file name and a first version indicator for a first file to be used by the printer;
  determining that the file system does not include the first file; and
  providing a copy of the first file on the file system.

29. The method of claim 28 wherein the identity of the print subsystem comprises an identity of the printer.

30. The method of claim 28 further comprising, as performed by the administrator program, activating a configuration routine to be executed by the printer.

31. The method of claim 28 wherein the step of providing comprises obtaining a copy of the first file from a second file server.

32. A printer comprising:

a print engine;

an interface for receiving data for printing via the print engine;

a memory that stores a file and a version indicator of the file; and a processor, coupled to the interface and to the memory, for reporting the version indicator to a provided server coupled to the interface, wherein the processor communicates the version indicator over the interface via at least one of NPAP protocol and SNMP protocol.

33. A scanner comprising:

a scan engine;

an interface for providing data from a provided document via the scan engine;

a memory that stores a file and a version indicator of the file; and a processor, coupled to the interface and to the memory, for reporting the version indicator to a provided server coupled to the interface, wherein the processor communicates the version indicator over the interface via at least one of NPAP protocol and SNMP protocol.

34. A computer peripheral for use with a computer system, the computer peripheral comprising:

an apparatus for performing at least one of providing input data to the computer system and receiving data output from the computer system;

an interface for coupling the apparatus to a computer network for data communication;

a memory that stores a file and a version indicator of the file, the file for execution by the apparatus to control operation of the apparatus; and a processor, coupled to the interface and to the memory, for reporting the version indicator to a provided server coupled to the interface, wherein the processor communicates the version indicator over the interface via at least one of NPAP protocol and SNMP protocol.

* * * * *